(12) United States Patent
Lau et al.

(10) Patent No.: US 11,173,451 B1
(45) Date of Patent: Nov. 16, 2021

(54) REMOVAL OF HYDROGEN IMPURITY FROM GAS STREAMS

(71) Applicant: Air Products and Chemicals, Inc., Allentown, PA (US)

(72) Inventors: Garret Chi-Ho Lau, New Tripoli, PA (US); William Jack Casteel, Jr., Fountain Hill, PA (US); Timothy Christopher Golden, Nevez (FR); Venkataramanan Ravi, Macungie, PA (US); Jeffrey Raymond Hufton, Fogelsville, PA (US); Guarav Kumar, Alburtis, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 17/083,435

(22) Filed: Oct. 29, 2020

(51) Int. Cl.
| | | |
|---|---|---|
| *B01D 53/86* | (2006.01) | |
| *B01D 53/96* | (2006.01) | |
| *B01J 23/889* | (2006.01) | |
| *B01J 35/10* | (2006.01) | |
| *C01G 45/12* | (2006.01) | |

(52) U.S. Cl.
CPC ....... *B01D 53/8671* (2013.01); *B01D 53/864* (2013.01); *B01D 53/869* (2013.01); *B01D 53/96* (2013.01); *B01J 23/8892* (2013.01); *B01J 35/1019* (2013.01); *B01J 35/1038* (2013.01); *C01G 45/12* (2013.01); *B01D 2255/2073* (2013.01); *B01D 2255/20761* (2013.01); *B01D 2255/904* (2013.01); *B01D 2255/9205* (2013.01); *B01D 2255/9207* (2013.01); *B01D 2257/108* (2013.01); *B01D 2257/502* (2013.01); *C01P 2006/12* (2013.01); *C01P 2006/14* (2013.01)

(58) Field of Classification Search
CPC ...... B01D 53/047; B01D 53/14; B01D 53/46; B01D 53/82; B01D 2251/602; B01D 2253/1124; B01D 2257/108; B01J 19/14; B01J 19/24; B01J 2208/00; B01J 2219/00918; B01J 2219/00921; C01B 3/00; C01B 3/0005; C01B 3/001; C01B 3/508
See application file for complete search history.

(56) References Cited

U.S. PATENT DOCUMENTS

| | | |
|---|---|---|
| 5,110,569 A | 5/1992 | Jain |
| 5,914,455 A | 6/1999 | Jain et al. |
| 8,940,263 B2 * | 1/2015 | Golden .............. B01D 53/8671 423/247 |
| 2003/0064014 A1 | 4/2003 | Kumar et al. |
| 2011/0207003 A1 * | 8/2011 | Anfang .............. H01M 8/0668 429/412 |

FOREIGN PATENT DOCUMENTS

EP 2789376 B1 1/2017

* cited by examiner

*Primary Examiner* — Timothy C Vanoy
(74) *Attorney, Agent, or Firm* — Matthew R. Weaver

(57) ABSTRACT

Trace hydrogen may be removed from a dry gas by passing the dry gas at a temperature from about 0° C. to about 60° C. through at least one layer of a first hopcalite catalyst to produce product gas that is at least substantially free of hydrogen, wherein the first hopcalite catalyst has a molar ratio of copper to manganese of more than 0.55. Advantages include increase hydrogen capacity, lower feed and regeneration temperatures and lower sensitivity to carbon dioxide than equivalent processes using standard hopcalite catalyst having a Cu/Mn molar ratio from 0.45 to 0.55.

20 Claims, 8 Drawing Sheets

REMOVAL OF HYDROGEN IMPURITY FROM GAS STREAMS

BACKGROUND TO THE INVENTION

The present invention relates generally to the removal of hydrogen ($H_2$) as an impurity from gas streams, typically together with the removal of carbon monoxide (CO) as a further impurity in the gas streams. In particular, the invention relates to the removal of these impurities from air. The invention has particular application in the production of high purity (HP) and ultra-high purity (UHP) nitrogen ($N_2$) gas.

In many chemical processes, carbon monoxide and hydrogen are undesired species in nitrogen because of their chemical reactivity. For example, the electronics industry requires UHP nitrogen (typically, CO and $H_2$ each less than 10 parts per billion by volume (ppbv) to provide an inert atmosphere for the production of semiconductor materials. Impurities present in the nitrogen during formation of the silicon wafers greatly increase chip failure rates.

When air is subjected to cryogenic separation to produce nitrogen, carbon monoxide present in the feed air will essentially end up in the product nitrogen since carbon monoxide and nitrogen have similar boiling points. Hydrogen enriches in the product nitrogen to approximately two times its concentration in the feed air. Therefore, the production of UHP nitrogen, i.e. nitrogen that is at least substantially free of carbon monoxide and hydrogen, for the electronics industry requires processes for removing hydrogen and/or carbon monoxide from the air or nitrogen stream.

In the conventional process for cryogenic separation of air to recover nitrogen and oxygen ($O_2$), feed air is compressed, cooled to low temperature, and then introduced to a cryogenic distillation unit (otherwise known as air separation unit or ASU), that usually involves one or two distillation columns. If not removed, water and carbon dioxide present in the feed air will freeze out and block heat exchangers employed for cooling the gas prior to distillation. The separation unit used to remove water and carbon dioxide is commonly referred to as the Front End Unit (FEU).

Before entering the FEU, atmospheric air is typically compressed to an elevated pressure from 50 to 150 psig (0.45 to 1.1 MPa), followed by water cooling and removal of condensed water. The cooled air, which is then about 100° F. (38° C.), can be further cooled to 40° F. (4.5° C.) using combination of a water chiller tower and Direct Contact After Cooling (DCAC). The bulk of the water present in the air is removed by condensation and phase separation. The gas is then passed to a molecular sieve bed or mixed alumina/molecular sieve beds of the FEU where the remaining water and carbon dioxide are removed by adsorption. This separation takes advantage of the fact that both water and carbon dioxide are much more strongly attracted to the solid adsorbents than oxygen and nitrogen, so they are preferentially removed from the gas stream by the adsorbent. The air stream exiting the bed, which is at least substantially free of carbon dioxide and water, is then sent to the cryogenic distillation unit.

Eventually, the capacity of the adsorbent to adsorb water and carbon dioxide is exhausted and water and/or carbon dioxide will begin to "break through" the adsorbent bed and leave the FEU. The exhausted bed is taken "off-line", i.e. off feed gas, and regenerated to desorb some of the water and carbon dioxide, and restore the adsorption capacity of the adsorbent. To achieve constant feed and product gas flow rates, at least two adsorbent beds are used, one bed "on-line" operating under the adsorption step while the other bed is regenerated, their roles being periodically reversed in the operating cycle.

Bed regeneration is conducted by heating the bed to higher temperature (thermal swing adsorption, or TSA—see, for example, U.S. Pat. Nos. 4,541,851 and 5,137,548) or by decreasing the pressure of the gas in the bed with no heating (pressure swing adsorption, or PSA—see, for example, U.S. Pat. No. 5,232,474). The heating step of the TSA approach can be conducted at the original feed pressure, or more commonly, at a lower pressure of 2 to 15 psig (0.1 to 0.2 MPa). In any case, a flow of a gas that is at least substantially free of carbon dioxide and water is used to simultaneously purge the beds. The present invention typically involves a thermal regeneration step, however the case of PSA regeneration can be applied.

During thermal regeneration, part of the purified air from the bed on feed, part of the UHP nitrogen product gas from the cryogenic distillation unit, or some of the waste stream from the cold box is heated to 200 to 250° C. The hot gas is passed through the adsorber bed being regenerated for a period of time equal to perhaps half of the total regeneration time. This step is then followed by flowing cool regeneration gas (e.g. at 5 to 30° C.) for the remainder of the regeneration time, thereby cooling the bed to that temperature. Regeneration is usually carried out in a countercurrent direction with respect to the adsorption step and is typically conducted at the lower pressure of 2 to 15 psig (0.1 to 0.2 MPa).

The conventional TSA FEU is quite capable of removing carbon dioxide and water from air. However, alumina or molecular sieve beds are not effective for the removal of carbon monoxide or hydrogen. Applications for UHP nitrogen in the electronics area often stipulate both hydrogen and carbon monoxide specifications. Thus, there is a need for processes for the combined removal of carbon monoxide and hydrogen from air.

A common approach for producing UHP nitrogen is air pre-treatment and involves oxidizing carbon monoxide and hydrogen in the feed gas and then removing the resultant carbon dioxide and water in the FEU. This approach is attractive because the oxidation reactions in the air stream are very favorable thermodynamically and equilibrium conversion is essentially complete. In addition, the by-products formed by the process are conveniently handled by the existing FEU.

The oxidation of carbon monoxide to carbon dioxide and of hydrogen to water in the presence of oxygen occurs readily in the absence of catalysts at high temperatures (e.g. above 500° C.). Oxidation at lower temperatures in air usually requires catalysts. In this regard, hopcalite is used to oxidise carbon monoxide and noble metal catalysts are used to oxidise hydrogen.

An example of the use of such catalysts to remove carbon monoxide and hydrogen from air in a FEU of a cryogenic ASU is provided in U.S. Pat. No. 6,511,640 which describes a TSA unit comprising an adsorbent bed consisting of a first layer to remove water, a second layer to oxidize carbon monoxide, a third layer to remove carbon dioxide, a fourth layer to oxidize hydrogen and a final adsorption layer to remove water and carbon dioxide. A hopcalite catalyst is specified for the carbon monoxide oxidation in the lower catalyst layer, and precious (e.g. noble) metal catalyst must be used to oxidise hydrogen to produce water in the upper catalyst layer. Hydrogen removal occurs by a chemisorption process rather than the typical reaction mechanism, as evidenced by breakthrough curves. Carbon dioxide interferes with the chemisorption and subsequent removal of hydrogen from the gas, so the precious metal catalyst is placed after both water removal (alumina layer) and carbon dioxide removal (13X). A final 13X layer is placed above the precious metal catalyst for capture of any water produced from the hydrogen oxidation.

However, known processes for removing hydrogen, or carbon monoxide and hydrogen using in-bed technology such as that disclosed in U.S. Pat. No. 6,511,640 suffers from a few issues.

First, the removal of hydrogen necessitates the use of expensive supported metal catalysts, typically a precious metal catalyst based on palladium, platinum, ruthenium, rhodium and the like, supported on alumina, zeolite, or silica. Precious metals are generally in high demand and subject to market forces, making them very expensive on a unit mass basis. The cost of the support, manufacture of the catalyst, shipping, etc. are additional charges on the final catalyst. In addition, catalysts employing precious metals are often loaded with the minimum amount of metal possible which makes them more susceptible to poisoning.

Secondly, the precious metal catalysts used in the in-bed technology are thermally regenerated in oxygen-containing streams, typically oxygen-enriched waste gas from the ASU. Noble metals are well known to resist oxidation, but over time they will slowly oxidize and lose catalytic activity under these conditions.

Thirdly, in-bed technologies designed to remove both carbon monoxide and hydrogen are often arranged with multiple catalyst layers, one for carbon monoxide oxidation and another for hydrogen oxidation. This arrangement is especially the case when there is reason to conduct the carbon monoxide oxidation and hydrogen oxidation at different locations within the TSA unit. For example, carbon monoxide oxidation is often conducted after water rejection (since water deactivates the catalyst) and before the carbon dioxide rejection (so carbon dioxide formed from the oxidation is removed as well). Hydrogen oxidation is often conducted after both water and carbon dioxide rejection. Precious metal-based catalyst can be specified for the two separate catalyst layers. It is widely known, however, that hopcalite is very effective for converting carbon monoxide to carbon dioxide. It is significantly cheaper than precious metal catalysts. This has led to the widespread specification of hopcalite for the carbon monoxide oxidation catalyst layer and noble metal-based catalyst for the hydrogen oxidation catalyst layer. Alternatively, it is known to use a silver-exchanged zeolite for carbon monoxide adsorption and removal, followed by a metal-based catalyst for hydrogen reaction. Increased layering in a packed bed leads to increased complexity for bed loading and replacement, and additional costs associated with screens for layer segregation. Some TSA vessel designs are not very amenable to multiple bed layers (e.g., radial flow designs), so an excessive number of layers can even make the approach infeasible.

Finally, most TSA designs incorporating oxidation catalyst utilize a final layer of adsorbent to capture any water or carbon dioxide formed from the oxidation of hydrogen and carbon monoxide in the catalyst layers. The adsorbent layer adds volume and therefore capital costs to the TSA vessel (in addition to the further cost for the adsorbent) as well as operating cost due to the increase in regeneration power and gas requirements since the vessel is larger and the adsorbent charge is greater. It also adds void volume, which decreases the effective recovery of purified gas from the TSA. Removal of deactivated catalyst is made more difficult, as the adsorbent layer must first be removed. Finally, the catalyst is not as effectively regenerated as it would if it was at the product end of the bed. This is because hot purge gas is passed from the product end to the feed end of the bed, so the impact of heat loss (external losses to the environment and energy used for desorption) becomes more significant as the catalyst layer is placed further from the product end of the bed.

The removal of both hydrogen and carbon monoxide impurities from a dry gas at low temperature (0° C. to 60° C.) using only hopcalite catalyst is taught in EP2662653A to Linde AG and in EP2789376A to Air Products and Chemicals, Inc.

The term "hopcalite" is a generic term for a range of catalysts typically comprising primarily a mixture of manganese oxide and copper oxide. Hopcalite catalysts have been known and used since at least 1920 (see, for example, U.S. Pat. No. 1,345,323) to oxidise carbon monoxide to form carbon dioxide.

In EP2789376A, the Inventors observed that hopcalite is able to simultaneously (i) oxidize carbon monoxide to carbon dioxide; (ii) chemisorb hydrogen; and (iii) oxidise hydrogen to form water, in addition to adsorbing the resultant carbon dioxide and water so produced. The mechanisms involved for carbon monoxide are as follows:

CO (gas)↔CO (adsorbed)
   i.e. CO from gas adsorbed on the catalyst surface
 CO (adsorbed)+O (surface)↔$CO_2$ (adsorbed)
   i.e. adsorbed CO reacts with oxygen on the catalyst surface to form $CO_2$
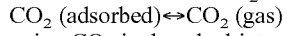 $CO_2$ (adsorbed)↔$CO_2$ (gas)
   i.e. $CO_2$ is desorbed into the gas phase Similar mechanisms are involved for hydrogen removal (substituting "$H_2$" for "CO" in these reaction mechanisms).

At the relevant time, while it was already known for carbon monoxide oxidation, hopcalite was not known at that time for the simultaneous removal of hydrogen. Indeed, based on the state of the art then, it was entirely unexpected that hydrogen would be removed by an adsorption mechanism. In the catalytic removal of hydrogen, the feed stream hydrogen is converted to water. Therefore, in a purely catalytic process, the feed impurity is converted to another species. However, the results of the experiments reported in EP2789376A clearly indicate that hydrogen is removed by adsorption. In this regard, hydrogen breaks through the bed and continues to increase in concentration until the bed is saturated and the feed inlet concentration is approached. Formation of water was not observed although it was acknowledged that water may also be formed from some of the hydrogen in the dry gas, but any product water must then be adsorbed by the catalyst. However, the Inventors note that the limiting hydrogen removal mechanism is adsorption which in turn determines the size of the adsorption bed.

The hopcalite is acting both as a catalyst and an adsorbent. The observation that hydrogen may be removed by adsorption has not been disclosed prior to EP2789376A because the hopcalite layer must satisfy certain criteria for hydrogen removal to be enabled.

First, at least substantially all of the water and carbon dioxide must be removed from the gas feed before it reaches the hopcalite, as they both compete with hydrogen for chemisorption sites in the catalyst. In this connection, it is preferable that the levels of water and carbon dioxide be each reduced to no more than 10 parts per million by volume ("ppmv"), preferably no more than 1 ppmv. This means that the hopcalite layer must be placed downstream of water and carbon dioxide removal layer(s) in an adsorption unit such as a TSA unit. As explained above, this is not the case in the relevant in-bed TSA prior art utilizing hopcalite for carbon monoxide oxidation.

Secondly, it was found from laboratory testing that a minimum residence time in the catalyst layer is necessary in order to effectively remove hydrogen by chemisorption. Where hopcalite is used in the art for carbon monoxide oxidation after water and carbon dioxide removal, the gas residence time in the catalyst bed is less than 1.2 s. The Inventors in EP2789376A found that significant hydrogen chemisorption on hopcalite requires a greater gas residence time in the catalyst layer, typically at least 1.5 s, and more preferably more than 2 s.

Since hopcalite is a relatively inexpensive catalyst, this approach enables the design and construction of simpler and lower cost layered TSA beds for FEUs. As an added benefit of this approach, as it is a mixture of metal oxides, hopcalite cannot suffer from over-oxidation during thermal regeneration with oxygen-enriched purge gas.

Typical hopcalite catalyst used for oxidation of carbon monoxide has a molar ratio of copper to manganese of 0.45 to 0.55, e.g. about 0.5, with a surface area ($N_2$ BET at 77K) of more than 250 $m^2/g$, e.g. from 280 $m^2/g$ to 320 $m^2/g$, and a total pore volume from 0.4 to 0.5 $cm^3/g$. Hereinafter, such a hopcalite catalyst is referred to as a "standard" hopcalite catalyst.

An example of a standard hopcalite catalyst in this context is Carulite® 300 (Carus Corporation) used in EP2662653 and EP2789376A.

It has now been discovered that removal of hydrogen impurity from dry gas, particularly air, is performed more efficiently by a hopcalite catalyst having a different composition from a standard hopcalite catalyst used to remove carbon monoxide. Specifically, the Inventors have discovered that removal of trace hydrogen is improved by the use of a hopcalite catalyst having a greater molar ratio of copper to manganese (Cu/Mn) than a standard hopcalite catalyst.

According to a first aspect of the present invention, there is provided a process for removing hydrogen from a dry gas comprising hydrogen as an impurity, said process comprising passing said dry gas at a temperature from about 0° C. to about 60° C. through at least one layer of a first hopcalite catalyst to produce product gas that is at least substantially free of hydrogen, wherein said first hopcalite catalyst has a molar ratio of copper to manganese of more than 0.55.

It is known from the prior art that the carbon monoxide capacity of hopcalite catalysts tends to decrease as the molar ratio of copper to manganese increases. However, to the Inventors' knowledge, the effect of the Cu/Mn molar ratio on hydrogen capacity of hopcalite catalysts has not been disclosed. In this regard, the Inventors have observed that the hydrogen capacity (mmol/g) of hopcalite catalysts is greater if the molar ratio of copper to manganese is above that of standard hopcalite catalysts. Therefore, there exists an opportunity to improve processes disclosed in EP2789376A through the careful selection of hopcalite catalysts.

The Inventors have observed that the hydrogen capacity of a hopcalite catalyst increases as the Cu/Mn molar ratio increases from about 0.5 and peaks as the Cu/Mn ratio reaches about 3. Thus, the molar ratio of copper to manganese in the first hopcalite catalyst is typically at least 0.6, or at least 0.7, or at least 0.8, or at least 0.9, or at least 1, or at least 1.1, or at least 1.2, or at least 1.5.

In addition, the Inventors have also observed that the hydrogen capacity of a hopcalite catalyst having a Cu/Mn molar ratio greater than about 7, e.g. about 10, is less than that of a standard hopcalite catalyst. Therefore, there is typically a "sweet spot" in the Cu/Mn molar ratio in terms of hydrogen capacity.

The molar ratio of copper to manganese in the first hopcalite catalyst is typically no more than 7, e.g. no more than 6 or no more than 5. Preferably, the molar ratio of copper to manganese in the first hopcalite catalyst is in a range from about 0.6 to about 4, e.g. from about 0.6 to about 3 or from about 1 to about 4.

As mentioned above, peak hydrogen capacity of a hopcalite catalyst has been observed to occur when the Cu/Mn molar ratio is about 3. Therefore, in some embodiments, the molar ratio of copper to manganese in the first hopcalite catalyst is in a range from about 1 to about 5, such as from about 2 to about 4, e.g. from about 2.5 to about 3.5. The Inventors expect that such hopcalite catalysts would be particularly suitable for catalyst layers where the focus is on removing trace hydrogen rather than trace carbon monoxide.

Also as mentioned above, the capacity of hopcalite for carbon monoxide tends to reduce as the Cu/Mn molar ratio increases beyond about 0.5. Therefore, in other embodiments, the molar ratio of copper to manganese in the first hopcalite catalyst is in a range from about 0.6 to about 1.2, e.g. from about 0.8 to about 1.2 or from about 0.9 to about 1.2 or from about 1 to about 1.2. The Inventors have observed that a hopcalite catalyst having a Cu/Mn molar ratio within these ranges, and particularly a hopcalite catalyst having a Cu/Mn molar ratio of 1, tends to strike an acceptable balance between gain in hydrogen capacity and loss of carbon monoxide capacity. The Inventors expect that such hopcalite catalysts would be particularly suitable for catalysts layers where the focus is on removing both trace hydrogen and trace carbon dioxide.

The dry gas may be passed through one or more layers of a first hopcalite catalyst to remove both hydrogen and carbon monoxide impurities.

In some embodiments, trace hydrogen and trace carbon monoxide may be removed by passing the dry gas across a single layer of the first hopcalite catalyst. In such embodiments, the Cu/Mn molar ratio of the first hopcalite catalyst may be in the range from about 0.6 to about 3, such as from about 0.6 to about 1.2, e.g. from about 0.8 to about 1.2 or from about 0.9 to about 1.2. Another suitable range for the Cu/Mn molar ratio may be from about 1 to about 3, such as from about 1 to about 1.2.

In other embodiments, trace hydrogen and trace carbon monoxide may be removed in primarily in separate layers of hopcalite. For example, trace carbon monoxide may be removed by passing the dry gas across at least one layer of either a standard hopcalite catalyst or a high Cu hopcalite catalyst or a mixture thereof, and trace hydrogen may be removed by passing the dry gas across at least one layer of a high Cu hopcalite catalyst.

In such embodiments, the Cu/Mn molar ratio of the high Cu hopcalite catalyst used to remove trace carbon monoxide may be in the range from about 0.6 to about 3, such as from about 0.6 to about 1.2, e.g. from about 0.8 to about 1.2 or from about 0.9 to about 1.2 or from about 1 to about 1.2. Additionally or alternatively, the Cu/Mn molar ratio of the high Cu hopcalite catalyst used to remove trace hydrogen may be in the range from about 0.6 to about 4, such as from about 2 to about 4, e.g. from about 2.5 to about 3.5.

In embodiments involving at least two layers of hopcalite catalyst, a layer of carbon dioxide adsorbent material may be provided between adjacent layers of hopcalite catalyst.

The Inventors have observed that the high Cu hopcalite catalyst are less sensitive to the presence of carbon dioxide in the dry gas than a standard hopcalite catalyst. In this regard, it is disclosed in EP2789376A that the feed gas to the catalyst layer must contain no more than 10 ppmv carbon dioxide in order to enable hydrogen removal by adsorption on the hopcalite. However, the Inventors have demonstrated that both hydrogen and carbon monoxide can still be removed effectively in the presence of 400 ppmv carbon dioxide.

Without wishing to be bound by any particular theory, the Inventors believe that the high Cu hopcalite catalyst is less affected by carbon dioxide because the surface area of the catalyst is less than the surface area of a standard hopcalite catalyst. Thus, the first hopcalite catalyst usually has a surface area of less than 280 $m^2/g$, such as no more than 250 $m^2/g$, e.g. from about 150 $m^2/g$ to about 250 $m^2/g$, or such as no more than 200 $m^2/g$, e.g. from about 100 $m^2/g$ to about 200 $m^2/g$.

The total pore volume and/or average pore size may also contribute to the improved performance of the high Cu hopcalite catalyst in the presence of carbon dioxide.

In this regard, the first hopcalite catalyst typically has a total pore volume of less than 0.4 $cm^3/g$. In preferred embodiments, the first hopcalite catalyst has a total pore volume in a range from about 0.1 $cm^3/g$ to about 0.3 $cm^3/g$.

An advantage of preferred embodiments of the present invention is that the process can accommodate higher concentrations of hydrogen and carbon monoxide impurities in the dry gas than the concentrations disclosed in EP2789376A. In this regard, the dry gas of the present process typically contains up to about 40 ppmv hydrogen, e.g. from more than 20 ppmv to about 40 ppmv. Additionally or alternatively, the dry gas may contain up to 50 ppmv carbon monoxide.

As mentioned above, the present process can accommodate a greater amount of carbon dioxide in the dry gas. In this regard, the process can accommodate up to about 900 ppmv carbon dioxide, e.g. up to 600 ppmv or up to 500 ppmv carbon dioxide, in the dry gas. The process will usually tolerate carbon dioxide in the dry gas in an amount of more than 10 ppmv to about 600 ppmv, such as from about 20 ppmv to about 600 ppmv, e.g. from about 50 ppmv to about 500 ppmv.

EP2789376A exemplifies regenerating a layer of standard hopcalite catalyst at a temperature of 180° C. In contrast, the high Cu hopcalite catalyst used in the present invention may be regenerated at a temperature below 180° C., for example no more than 150° C. or no more than 100° C., e.g. from about 50° C. to 100° C. or about 70° C. or about 60° C.

The lower regeneration temperature extends the range of air pre-purification cycles in which hopcalite can be used to remove both carbon monoxide and hydrogen. In this regard, the present process may be incorporated within a temperature swing adsorption (TSA) cycle, a thermal pressure swing adsorption (TPSA) cycle or a thermally enhanced pressure swing adsorption (TEPSA) cycle which have decreasing regeneration temperature levels of about 200° C., about 180° C. and about 60° C. respectively. The high Cu hopcalite catalyst would be significantly less expensive than noble metal catalyst in either TEPSA or PSA.

A further advantage of preferred embodiments of the present invention is that preferred feed temperatures may be lower. In this regard, the dry gas in EP2789376A is most preferably at a temperature from about 15° C. to about 30° C. However, in the present invention, the dry gas may be at a temperature below 15° C. down to about 10° C.

The dry gas is usually passed through the layer(s) of the first hopcalite catalyst at a pressure in a range from about 3 bar to about 45 bar (0.3 MPa to 4.5 MPa), typically from about 3 bar to about 30 bar (0.3 MPa to 3 MPa).

The dry gas may be passed through at least one layer of a second hopcalite catalyst upstream of first layer(s) of the first hopcalite catalyst, wherein the second hopcalite catalyst has a molar ratio of copper to manganese of no more than 0.55. In these embodiments, the dry gas is typically passed through a layer of carbon dioxide adsorbent material downstream of the second hopcalite catalyst and upstream of the first hopcalite catalyst.

Thus, in one embodiment of the first aspect, there is provided a process for removing hydrogen from dry air comprising the hydrogen as an impurity, the process comprising passing the dry air at a pressure from about 3 bar to about 30 bar (0.3 MPa to 3 MPa) and at a temperature from about 0° C. to about 60° C. through at least one layer of a first hopcalite catalyst to produce dry air that is at least substantially free of hydrogen, wherein the first hopcalite catalyst has a molar ratio of copper to manganese in a range from about 2 to about 4.

In addition, in a second embodiment of the first aspect, there is provided a process for removing hydrogen and carbon monoxide from dry air comprising the hydrogen and the carbon monoxide as impurities, the process comprising passing the dry air at a pressure from about 3 bar to about 30 bar (0.3 MPa to 3 MPa) and at a temperature from about 0° C. to about 60° C. through at least one layer of a first hopcalite catalyst to produce dry air that is at least substantially free of hydrogen and carbon monoxide, wherein the first hopcalite catalyst has a molar ratio of copper to manganese in a range from about 0.6 to about 1.2, e.g. from about 0.9 to about 1.2.

In a second aspect of the present invention, there is provided an adsorption unit for removing water, carbon dioxide, hydrogen and carbon monoxide impurities from a gas comprising the impurities, the unit comprising an adsorbent bed having a feed end and a product end opposite the feed end, the adsorbent bed consisting of:

a layer of water adsorbent material provided at the feed end of the bed for removing water from the gas to produce dry gas;

at least one layer of a first hopcalite catalyst having a molar ratio of copper to manganese of more than 0.55 for removing hydrogen impurity from the dry gas to produce product gas that is substantially free of hydrogen; and at least one layer of carbon dioxide adsorbent material for removing carbon dioxide from the dry gas; and optionally at least one layer of a second hopcalite catalyst upstream of the layer(s) of the first hopcalite catalyst for removing carbon monoxide from the dry gas, wherein the second hopcalite catalyst has a molar ratio of copper to manganese of no more than 0.55.

Various arrangements of the layers in the adsorbent bed are possible. In this regard, the adsorbent bed may consist of (in "on stream" order):

a layer of a water adsorbent material, a single layer of the first hopcalite catalyst and a single layer of a carbon dioxide adsorbent material a layer of a water adsorbent material, a single layer of the carbon dioxide adsorbent material and a single layer of the first hopcalite catalyst—preferred when the unit is a TEPSA unit a layer of a water adsorbent material, a single layer of the carbon dioxide adsorbent material, a single layer of the first hopcalite catalyst and a single layer of a carbon dioxide adsorbent material a layer of a water adsorbent material, a first layer of the first hopcalite catalyst, a single layer of a carbon dioxide adsorbent material and a second layer of a first hopcalite catalyst—preferred when the unit is a TSA unit, a TPSA unit or a TEPSA unit a layer of a water adsorbent material, a single layer of a standard hopcalite catalyst, a single layer of a carbon dioxide adsorbent material and a single layer of the first hopcalite catalyst—preferred when the unit is a TSA unit, a TPSA unit or a TEPSA unit a layer of a water adsorbent material, a single layer of a standard hopcalite catalyst, a single layer of the first hopcalite catalyst and a single layer of a carbon dioxide adsorbent material a layer of a water adsorbent material, a single layer of a carbon dioxide adsorbent material, a single layer of a standard hopcalite catalyst and a single layer of the first hopcalite catalyst In each of the three arrangements described above as preferred, the use of high Cu hopcalite catalyst results in the use of lower total amount of catalyst than if using just standard hopcalite catalyst.

According to a third aspect of the invention, there is provided use of hopcalite having a molar ratio of copper to manganese of more than 0.55 to remove hydrogen as an impurity from a dry gas comprising the impurity.

The hopcalite catalysts are typically the sole catalysts present for removing hydrogen. Thus, one advantage of preferred embodiments of the present invention is that hydrogen impurity is removed from the dry gas in the absence of a noble metal catalyst.

DETAILED DESCRIPTION OF THE INVENTION

Figure 1:
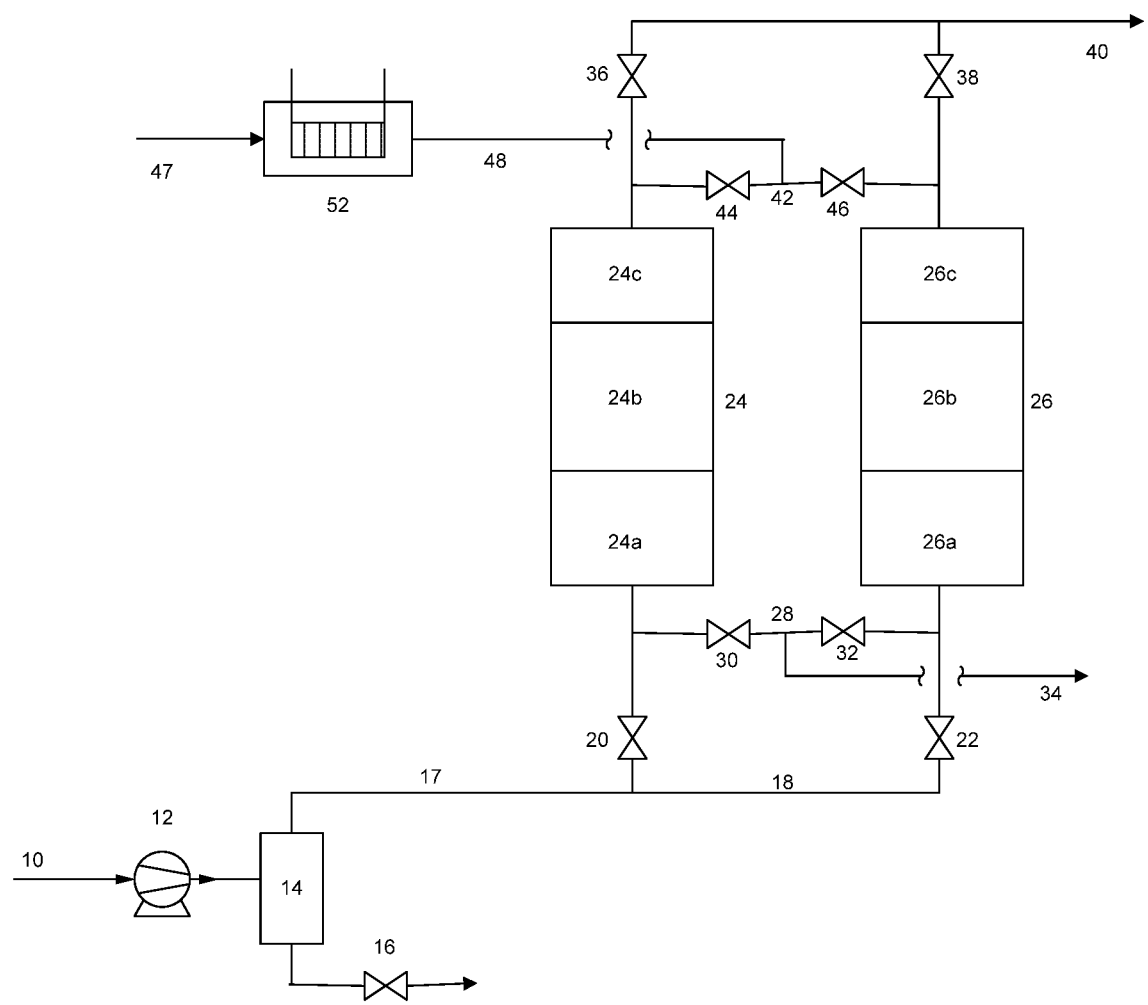
FIG. 1 is a flow sheet depicting an embodiment of the present invention with three layers in each TSA unit.

A process for removing hydrogen from a dry gas comprising hydrogen as an impurity, the process comprising passing the dry gas at a temperature from about 0° C. to about 60° C. through at least one layer of a first hopcalite catalyst to produce product gas that is at least substantially free of hydrogen, wherein said first hopcalite catalyst has a molar ratio of copper to manganese of at least 0.6.

The hydrogen impurity, or trace hydrogen, is typically removed from the dry gas in the absence of a noble metal catalyst.

Hopcalite is typically present as the sole catalyst for removing trace hydrogen. The hopcalite catalyst is either high Cu hopcalite catalyst alone or a combination of high Cu hopcalite catalyst and standard hopcalite catalyst. Where combinations of different hopcalites are used, the different hopcalite catalysts are preferably in different layers from each other although one or more layers of mixed hopcalites are possible.

The first hopcalite catalyst typically comprises from about 5 wt % to about 40 wt % manganese and from about 25 wt % to about 70 wt % copper in embodiments having a molar ratio of copper to manganese in the range from about 0.6 to about 10, and from about 15 wt % to about 40 wt % manganese and from about 25 wt % to about 60 wt % copper in embodiments having a molar ratio of copper to manganese in the range from about 0.6 to about 3. In this regard, "wt %" is based on the total metal content of the catalyst measured by X-ray fluorescence, or XRF.

The first hopcalite catalyst may consist essentially of oxides of manganese and copper. However, in preferred embodiments, the catalyst comprises at least one (and preferably each) additional metal species selected from the group consisting of potassium, sodium, calcium, silicon, and aluminum. The additional metal species are typically present in total amount from about 2 wt % to about 10 wt %.

The first hopcalite catalyst may have any suitable form but is usually in the form of pellets such as extruded pellets. The catalyst pellets typically have a mean average diameter in a range from about 1 mm to about 6 mm, such as from about 2.5 mm to 3.5 mm, and a mean average length in a range from about 1 mm to about 10 mm, such as from about 3 mm to about 7 mm.

The dry gas typically has a residence time within the layer of high Cu hopcalite of at least 0.1 s, such as at least 0.2 s, e.g. at least 0.3 s. The residence time of the dry gas within the layer of high Cu hopcalite catalyst is preferably no more than about 5 s, such as no more than 4 s, e.g. no more than 3 s or no more than 2 s. The residence time may be from 0.1 s to 5 s, from 0.2 s to 4 s or from 0.3 s to 3 s. However, the residence time is usually shorter than required in EP2789376A due to the greater reactivity of the catalyst to hydrogen.

In the context of the present invention, "residence time" is defined as the volume of the catalyst layer divided by the volumetric feed gas flow rate evaluated at the temperature and pressure within the catalyst layer.

The hydrogen content of the dry gas is typically no more than about 40 ppmv. The hydrogen content in the dry gas may be as low as about 0.1 ppmv, e.g. from about 0.1 ppmv to about 40 ppmv, e.g. from more than 20 ppmv to about 40 ppmv.

The carbon monoxide content of the dry gas is typically no more than about 50 ppmv, and usually from about 0.5 ppmv to about 20 ppmv.

The dry gas typically contains no more than about 10 ppmv, usually no more than about 1 ppmv and typically no more than 0.5 ppmv, water.

Since the catalyst comprises a mixture of metal oxides, the catalyst itself may provide the oxygen required to oxide carbon monoxide and/or hydrogen. In this regard, carbon monoxide would be oxidised to carbon dioxide according to the following reaction mechanism:

$$CO + MnO_2 \rightarrow CO_2 + MnO$$

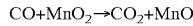

On this basis, the presence of oxygen ($O_2$) in the gas is not required for the oxidation. That said, oxygen gas may be present in the dry gas and, if so, would be available as the oxidant for the oxidation reactions. Oxygen may be present in an amount from about 1 mol. % to about 99.9 mol. %. In some embodiments, the dry gas is oxygen containing for example up to 1 mol. % hydrogen as an impurity. In other embodiments, in addition to the oxygen, the dry gas may comprise at least one other gaseous component such as nitrogen and/or one or more noble gases. In such embodiments, oxygen may be present in an amount from about 1 mol. % to about 50 mol. %. In preferred embodiments, the dry gas is air.

The process may be carried out at any suitable pressure, for example at atmospheric pressure or about 1 bar (0.1 MPa). The effect of increasing the pressure of the gas is to increase the partial pressure of the impurity being removed. Since adsorption capacity increases as partial pressure increases, operation of the process at higher pressures enhances the adsorptive capacity of the bed, thereby enabling a reduction in size of the bed. The process is therefore preferably operated at an elevated pressure of more than 1 bar (0.1 M Pa) and usually less than 50 bar (5 MPa), e.g. from about 3 bar to about 25 bar (0.3 to 2.5 MPa). Throughout the document, pressures given in metric units are calculated on an absolute basis.

The dry gas is typically at a temperature from about 0° C. to about 60° C., e.g. from about 5° C. to about 50° C., such as from about 15° C. to about 30° C., i.e. about ambient temperature, or from about 10° C. to about 15° C.

The product gas typically comprises no more than about 1 ppmv, e.g. no more than about 500 ppb, preferably no more than about 50 ppb and more preferably no more than about 10 ppb, carbon monoxide.

The product gas typically comprises no more than about 1 ppmv, e.g. no more than about 500 ppb, preferably no more than about 50 ppb and more preferably no more than about 10 ppb, hydrogen.

The dry gas may be formed by passing feed gas through at least one adsorbent layer to remove water and carbon dioxide. The adsorbent layer may comprise either alumina or potassium carbonate-promoted alumina alone (to remove both water and carbon dioxide), or a first layer of alumina or potassium carbonate-promoted alumina (to remove primarily water) together with a second layer of zeolite (e.g. 13X) to remove carbon dioxide.

There may be a layer of carbon dioxide adsorbent material (e.g. 13X zeolite) after the catalyst layer to capture carbon dioxide in the product gas that breaks through the catalyst layer.

In preferred embodiments, the catalyst layer is regenerated. In this connection, the catalyst must be regenerated thermally in order to restore the chemisorptive capacity of the catalyst towards hydrogen. The catalyst layer is preferably regenerated by passing a regeneration gas at a temperature in a range from about 60° C. to about 200° C., or from about 60° C. to less than 180° C., through the catalyst layer. The regeneration gas is usually passed through the catalyst layer for not more than 6 h and usually not more than 4 h.

The catalyst layer is usually regenerated by passing a regeneration gas at a temperature of at least 60° C. through the catalyst layer for at least 25 min. More preferably, the regeneration gas is passed at a temperature of at least 150° C. for at least 2 h.

Any suitable gas may be used as the regeneration gas. For example, the regeneration gas may comprise a waste gas from a cryogenic distillation process. In another example, the regeneration gas comprises a portion of the product gas. In a yet further example, the regeneration gas comprises oxygen and is at a temperature at least as high as the temperature of the product gas when used as regeneration gas, to supply oxygen to the catalyst surface.

The invention will now be described with reference to the flow sheets depicted in FIGS. 1 and 2.

According to FIG. 1, a stream 10 of air is compressed to an elevated pressure from 3 bar to 25 bar (0.3 to 2.5 MPa) in a main air compressor 12. The compressed stream is cooled in cooler 14 and a portion of the water in the air stream is condensed and separated from the gas and discharged through valve 16. A stream 17 of cooled, partially dried air at a temperature of 5 to 60° C. is then passed to vessel 24 via valve 20. Vessels 24 and 26 are each packed with identical layers of adsorbent and catalyst.

Within the vessels, the feed air passes to a first layer (24a or 26a) of water adsorbent which dries the feed air. This layer can also remove a portion of the carbon dioxide in the feed gas due to co-adsorption of carbon dioxide with water. This layer typically consists of alumina, base-promoted alumina, or silica gel.

The dried feed air then passes to a second layer (24b or 26b) where carbon dioxide is removed to a level of 10 ppmv or less. This layer consists of a zeolitic adsorbent such as NaX, NaLSX or CaX.

The dried, carbon dioxide-free air is then passed to a layer of high copper hopcalite (24c or 26c) where carbon monoxide is oxidized to carbon dioxide and hydrogen is chemisorbed and possibly reacted to form water. The resultant trace level of carbon dioxide and any water produced from these reactions are adsorbed onto the hopcalite.

Air flow continues for a predetermined period of time, and the various layers are sized so that water, carbon dioxide, carbon monoxide, and hydrogen are retained in the bed and a stream of purified air (containing no more than 0.5 ppmv water, no more than 1 ppmv carbon dioxide, no more than 500 ppb carbon monoxide, and no more than 500 ppb hydrogen) exits the vessel 24. This purified air passes through valve 36 and is directed as stream 40 to a cryogenic distillation system (not shown) where UHP nitrogen is produced.

Vessel 26 is subjected to thermal regeneration steps while vessel 24 is processing the feed stream. Regeneration desorbs water from layer 26a and carbon dioxide from layer 26b. In addition, thermal regeneration of the hopcalite catalyst in layer 26c restores the hydrogen chemisorption capacity of the material. Thermal regeneration may be conducted at a temperature of at least 60° C., more preferably at least 150° C., for example at about 180° C., in order to drive chemisorbed hydrogen/water from the catalyst.

Regeneration is conducted by heating a stream 47 of dry, carbon dioxide-free purge gas through heater 52 to produce a stream 48 of warm purge gas which is fed to vessel 26 via manifold 42 and valve 46. The purge gas can be taken as a portion of the product gas 40 or from waste gas from the cryogenic distillation unit. The warm purge gas passes through layers 26c, 26b, and 26a of vessel 26, thereby regenerating the catalyst and adsorbent. The effluent gas from bed 26 passes through valve 32 and manifold 28 before being vented from the process as stream 34. Once the layers have been sufficiently warmed and regenerated, the bed is cooled by turning off or by-passing heater 52 so that cool purge gas at a temperature from 10 to 60° C. flows through the bed.

The feed and regeneration steps are conducted as described for a predetermined period of time, after which the functions of vessels 24 and 26 are switched so vessel 26 comes "on-line" and accepts feed gas, and vessel 24 goes "off-line" and is regenerated. The vessels alternate between feed and regeneration to maintain constant production of purified air.

Those familiar with the art will realize that the regeneration step can be conducted in different ways to help improve the efficiency of the process. The bed undergoing regeneration can first be depressurized to essentially atmospheric pressure via valves 30 or 32 and vent 34, and the heating and cooling step can be conducted at the lower pressure. The warm purge fluid can be fed to the vessel until the entire vessel reaches the higher regeneration temperature, and then the cooling gas flow can be started. This is known in the art as a TSA cycle. However, in preferred embodiments, only a portion of the warm purge gas needed to heat the entire contents of the vessel is used before starting the cooling step. This generates a heat pulse that sequentially passes through all the layers of catalyst and adsorbent, and the energy content of the pulse decreases as it passes to the feed side of the vessel, known in the art as TPSA or TEPSA cycles (due to heat loss and providing energy for water and carbon dioxide desorption).

FIG. 1 illustrates a two-bed TSA process, but systems utilizing three or more vessels are also possible.

Figure 2:
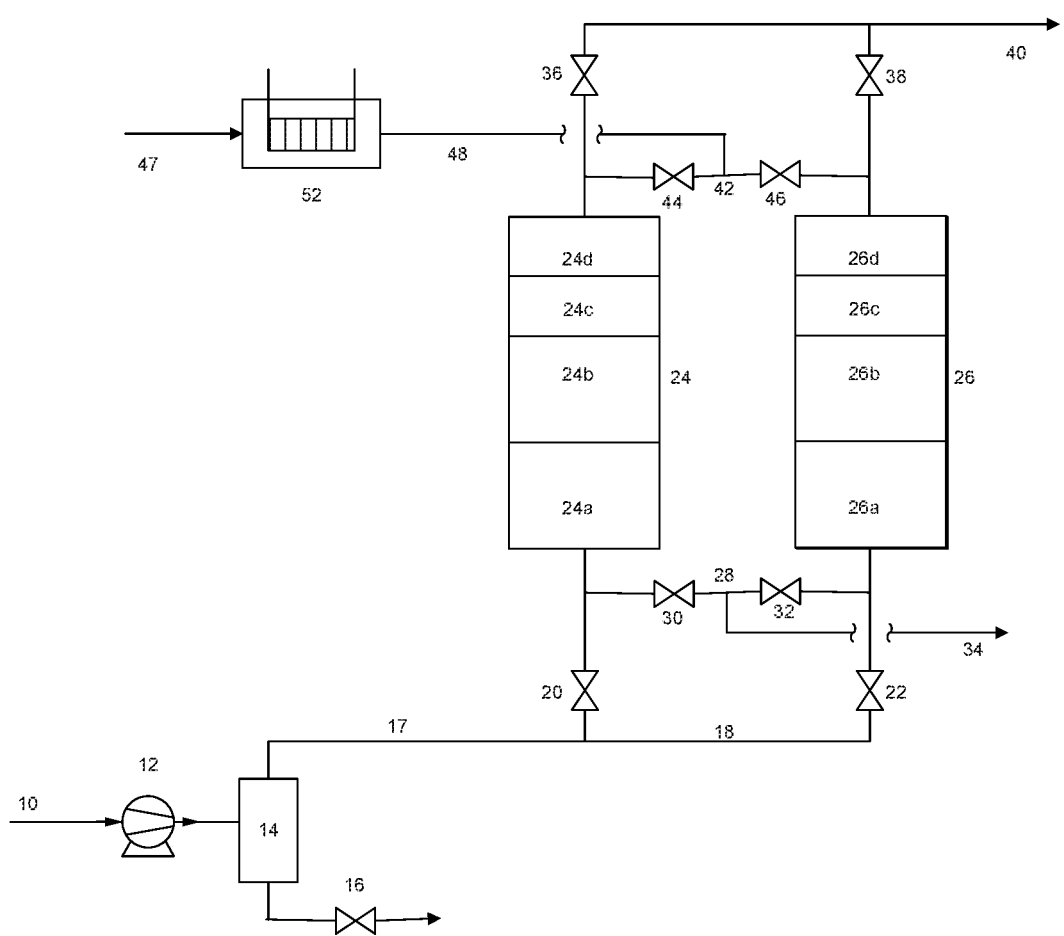
FIG. 2 is a flow sheet depicting an embodiment of the present invention with four layers in each TSA unit.

A second embodiment of the invention is illustrated in FIG. 2 where an additional adsorbent layer 24d, 26d is added after the catalyst layer 24c, 26c. Although the hopcalite catalyst has a significant capacity for carbon dioxide adsorption, the capacity is finite. It is therefore possible that breakthrough of carbon dioxide formed from carbon monoxide oxidation in the catalyst would limit the time during which the system illustrated in FIG. 1 is on-line. In that case, a longer on-line time can be achieved by adding a short layer 24d, 26d of carbon dioxide adsorbent after the hopcalite layer. This layer would consist of a zeolitic adsorbent such as 13X, CaX, or NaLSX.

Aspects and Embodiments of the Invention Include:

1. A process for removing hydrogen from a dry gas comprising hydrogen as an impurity, said process comprising passing said dry gas at a temperature from about 0° C. to about 60° C. through at least one layer of a first hopcalite catalyst to produce product gas that is at least substantially free of hydrogen, wherein said first hopcalite catalyst has a molar ratio of copper to manganese of more than 0.55.

2. A process according to #1, wherein said molar ratio of copper to manganese in said first hopcalite catalyst is less than 7.

3. A process according to #1 or #2, wherein said molar ratio of copper to manganese in said first hopcalite catalyst is in a range from 0.6 to 4.

4. A process according to any of #1 to #3, wherein said molar ratio of copper to manganese in said first hopcalite catalyst is in a range from 2 to 4.

5. A process according to #4, wherein said dry gas is passed through a single layer of said first hopcalite catalyst.

6. A process according to #4, wherein said dry gas is passed through two layers of said first hopcalite catalyst.

7. A process according to #6, wherein said dry gas is passed through a layer of carbon dioxide adsorbent material between said two layers of said first hopcalite catalyst.

8. A process according to any of #1 to #3, wherein said molar ratio of copper to manganese in said first hopcalite catalyst is in a range from 0.6 to 1.2, preferably from about 0.9 to about 1.2.

9. A process according to #8, wherein said dry gas is passed through a single layer of said first hopcalite catalyst.

10. A process according to any of #1 to #9, wherein said first hopcalite catalyst has a surface area of less than 280 m$^2$/g.

11. A process according to any of #1 to #10, wherein said first hopcalite catalyst has a surface area in a range from 100 m$^2$/g to 200 m$^2$/g.

12. A process according to any of #1 to #11, wherein said first hopcalite catalyst has a total pore volume of less than 0.4 cm$^3$/g.

13. A process according to any of #1 to #12, wherein said first hopcalite catalyst has a total pore volume in a range from 0.1 cm$^3$/g to 0.3 cm$^3$/g.

14. A process according to any of #1 to #13, wherein hydrogen impurity is present in said dry gas in an amount of up to 40 ppmv.

15. A process according to any of #1 to #14, wherein hydrogen impurity present in said dry gas in an amount of more than 20 ppmv.

16. A process according to any of #1 to #15, wherein said dry gas comprises carbon dioxide in an amount up to 900 ppmv.

17. A process according to #1, wherein said dry gas comprises carbon dioxide in an amount up to 600 ppmv.

18. A process according to any of #1 to #16, wherein said dry gas comprises carbon dioxide in an amount of more than 10 ppmv.

19. A process according to any of #1 to #18, wherein said layer(s) of said first hopcalite catalyst is/are regenerated at a temperature below 200° C.

20. A process according to any of #1 to #19, wherein said layer(s) of said first hopcalite catalyst is/are regenerated at a temperature no more than 150° C.

21. A process according to any of #1 to #20, wherein said layer(s) of said first hopcalite catalyst is/are regenerated at a temperature no more than 80° C.

22. A process according to any of #1 to #21, wherein the temperature of said dry gas is in a range from 10° C. to 15° C.

23. A process according to any of #1 to #22, wherein said dry gas is passed through said layer(s) of said first hopcalite catalyst at a pressure in a range from 3 bar to 45 bar (0.3 MPa to 4.5 MPa).

24. A process according to any of #1 to #23, said process comprising passing the dry gas through at least one layer of a second hopcalite catalyst upstream of said layer(s) of said first hopcalite catalyst, wherein said second hopcalite catalyst has a molar ratio of copper to manganese of no more than 0.55.

25. A process according to #24, wherein said dry gas is passed through a layer of carbon dioxide adsorbent material downstream of said second hopcalite catalyst and upstream of said first hopcalite catalyst.

26. A process for removing hydrogen from dry air comprising said hydrogen as an impurity, said process comprising passing said dry air at a pressure from 3 bar to 45 bar (0.3 MPa to 4.5 MPa) and at a temperature from 0° C. to 60° C. through at least one layer of a first hopcalite catalyst to produce dry air that is at least substantially free of hydrogen, wherein said first hopcalite catalyst has a molar ratio of copper to manganese in a range from 2 to 4.

27. A process for removing hydrogen and carbon monoxide from dry air comprising said hydrogen and said carbon monoxide as impurities, said process comprising passing said dry air at a pressure from 3 bar to 45 bar (0.3 MPa to 4.5 MPa) and at a temperature from 0° C. to 60° C. through at least one layer of a first hopcalite catalyst to produce dry air that is at least substantially free of hydrogen and carbon monoxide, wherein said first hopcalite catalyst has a molar ratio of copper to manganese in a range from 0.6 to 1.2, preferably from about 0.9 to about 1.2.

28. A process according to any of #1 to #27 wherein the dry gas is oxygen.

29. A process according to any of #1 to #27 wherein the dry gas is air.

30. An adsorption unit for removing water, carbon dioxide, hydrogen and carbon monoxide impurities from a gas comprising said impurities, said unit comprising an adsorbent bed having a feed end and a product end downstream of said feed end, said adsorbent bed consisting of:
- a layer of water adsorbent material provided at the feed end of the bed for removing water from said gas to produce dry gas;
- at least one layer of a first hopcalite catalyst having a molar ratio of copper to manganese of more than 0.55 for removing hydrogen impurity from said dry gas to produce product gas that is substantially free of hydrogen; and
- at least one layer of carbon dioxide adsorbent material for removing carbon dioxide from said dry gas; and optionally
- at least one layer of a second hopcalite catalyst upstream of said layer(s) of said first hopcalite catalyst for removing carbon monoxide from said dry gas, wherein said second hopcalite catalyst has a molar ratio of copper to manganese of no more than 0.55.

31. An adsorption unit according to #30, wherein said adsorbent bed consists of said layer of water adsorbent material, a single layer of said first hopcalite catalyst and a single layer of said carbon dioxide adsorbent material.

32. An adsorption unit according to #30, wherein said adsorbent bed consists of said layer of water adsorbent material, a single layer of said carbon dioxide adsorbent material, a single layer of said first hopcalite catalyst and optionally a single layer of said carbon dioxide adsorbent material.

33. An adsorption unit according to #32, wherein said unit is a TEPSA unit.

34. An adsorption unit according to #30, wherein said adsorption bed consists of said layer of water adsorbent material, a first layer of said first hopcalite catalyst, a single layer of said carbon dioxide adsorbent material and a second layer of said first hopcalite catalyst.

35. An adsorption unit according to #30, wherein said adsorption bed consists of said layer of water adsorbent material, a single layer of said second hopcalite catalyst, a single layer of said carbon dioxide adsorbent material and a single layer of said first hopcalite catalyst.

36. An adsorption unit according to #35, wherein said unit is a TSA unit, a TPSA unit or a TEPSA unit.

37. An adsorption unit according to #35, wherein said single layer of said carbon dioxide adsorbent material is downstream of said single layer of said first hopcalite catalyst.

38. An adsorption unit according to #35, wherein said single layer of said carbon dioxide adsorbent material is upstream of said single layer of said second hopcalite catalyst.

39. Use of hopcalite having a molar ratio of copper to manganese of more than 0.55 to remove hydrogen as an impurity from a dry gas comprising the impurity.

EXAMPLES

The present invention will now be described in the following examples. In all of the examples, units of ppmv and ppb are on a molar basis.

Example 1—Preparation of Hopcalite Catalysts with Different Cu/Mn Molar Ratios and Measurement of Hydrogen and Carbon Monoxide Uptake Capacities Samples of hopcalite catalysts with copper to manganese molar ratios of 0.3, 0.7, 1.0, 3.0, and 10.0 were prepared by a method comparable to that of Hutchings et al (Applied Catalysis A: General 166 (1998) 143-152). Thus, solutions of copper (II) nitrate and manganese (II) nitrate solutions were mixed at target Cu/Mn ratios, precipitated by addition of an aqueous solution of sodium carbonate ($Na_2CO_3$), and washed with water to remove excess dissolved sodium. The solids were air dried at 90° C. and then calcined at 400° C. to remove carbon dioxide. The compositions made in this manner had lower surface areas than commercially supplied hopcalite, with surface areas less than 100 $m^2/g$. Particle sizes from each composition were determined to be similar from powder X-ray diffraction line broadening of diffraction peaks. hydrogen uptake differences were therefore attributed to Cu/Mn differences, and not to variation in particle size or surface area.

Hydrogen ($H_2$) uptake capacity on synthesized hopcalites catalysts were measured on a commercial gas isotherm measurement device (HPA 300 Adsorption Unit, VTI Corp.). Two grams were used for each hopcalite powder. The powders were vacuum activated at 200° C. overnight, then held at 30° C. for duration of hydrogen uptake measurement. Hydrogen was dosed at increasing partial pressures, with 5.5 seconds of equilibration time, to simulate contact times in packed column breakthrough experiments. After 5.5 seconds, the uptake capacity was recorded by the instrument, and the next incremental pressure of hydrogen was dosed.

Figure 3:
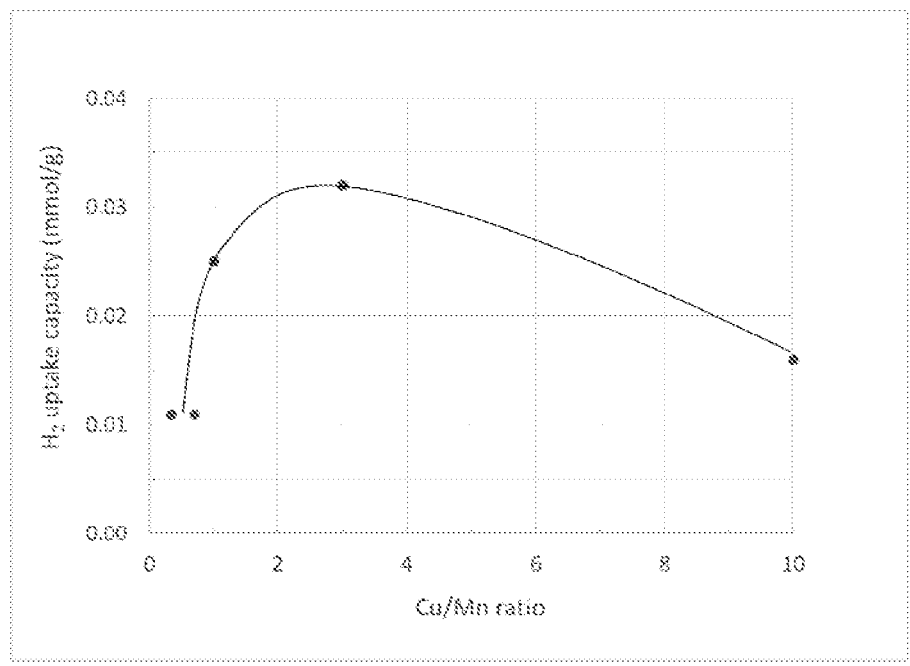
FIG. 3 is a graph depicting the relationship between hydrogen uptake capacity (mmol/g) and Cu/Mn molar ratio in synthesized hopcalites (Example 1).

Comparative hydrogen uptake capacities at 75 torr (10 kPa) partial pressure are shown in FIG. 3. In this regard, hydrogen capacity is seen to increase significantly for hopcalites having a molar ratio of copper to manganese of 1 and 3, but to fall off for hopcalite having a molar ratio of copper to manganese of 10.

Hydrogen and carbon monoxide (CO) uptake capacity on commercial hopcalite catalysts were measured similarly as above using a Micromeritics 3-Flex commercial gas isotherm measurement device. Commercially available standard and high copper hopcalite catalysts were chosen, with typical properties as described in Table 1.

TABLE 1

| Properties | Feed gas impurities | Standard hopcalite | High Cu hopcalite |
|---|---|---|---|
| Cu/Mn molar ratio | | 0.45 to 0.55 | 0.6 to 3.0 |
| Surface area ($m^2/g$) | | 280 to 320 | 100 to 200 |
| Bulk density ($kg/m^3$) | | 720 to 1000 | 750 to 1100 |
| Dimensions | | 6 × 12 US mesh granules | 3 mm diameter extrudates |
| Total Pore Volume ($cm^3/g$) | | 0.4 to 0.5 | 0.1 to 0.3 |
| Hg density ($g/cm^3$) | | 1.3 | 1.7 |
| He density ($g/cm^3$) | | 2.7 | 2.4 |
| Average pore diameter (nm) | | 40 | 5 |
| Water content at 200° C. (wt %) | | 4 | 2 |
| Nomialized residence time required for <0.1 ppm $H_2$ and CO in product gas | 2ppm $H_2$ | 1 | 0.4 |
| | 10 ppm CO | 0.5 | 0.7 |
| | 2ppm $H_2$, 10 ppm CO | 1.3 | 0.9 |
| | 2 ppm $H_2$, 10 ppm CO, 400 ppm $CO_2$ | 12.6 | 1.7 |
| | 2 ppm $H_2$, 10 ppm CO, 10 ppm $H_2$ spike for 30 min | >4.1 | 1.9 |

*Based on 240 min onstream time, 130 psi g (9 bar g), 25° C. feed as conditions, and impurity concentrations in air given in the table. Relative catalyst residence times normalized versus residence time for standard hopcalite with only 2 ppm $H_2$ impurity challenge.

Two grams of each hopcalite catalyst was vacuum activated at 200° C. overnight, then held at 25° C. for duration of hydrogen or carbon monoxide uptake measurement. Hydrogen or carbon monoxide was dosed at increasing partial pressures, with 10 seconds of equilibration time. After 10 seconds, the uptake capacity was recorded by the instrument, and the next incremental pressure of hydrogen or carbon monoxide is dosed.

Figure 4:
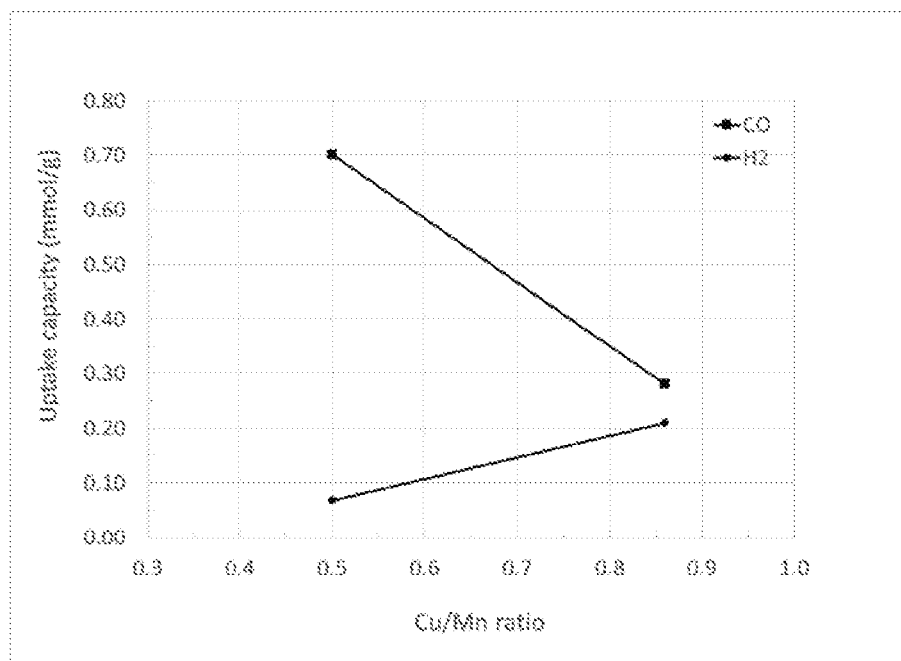
FIG. 4 is a graph depicting the relationship between both hydrogen uptake capacity and carbon monoxide uptake capacity (mmol/g) and Cu/Mn molar ratio in commercial hopcalites (see Example 1).

Comparative hydrogen and carbon monoxide uptake capacities at 5 torr (0.7 kPa) and 10 torr (1.4 kPa) respectively, partial pressure are shown in FIG. 4. Carbon monoxide capacity is higher for the commercial hopcalite having a copper to manganese ratio of 0.5 compared to the commercial hopcalite having a copper to manganese ratio of 0.9.

The increase in hydrogen capacity of hopcalites having higher Cu/Mn molar ratios is unexpected, given that the carbon monoxide capacity is lower for these hopcalites.

Example 2—Breakthrough Experiments

Feed gas was passed through a reactor vessel packed with hopcalite, and the gas effluent concentration was monitored to demonstrate the performance differences of standard vs. high Cu hopcalite. The reactor vessel was fitted with sample taps along the length of the reactor.

The same commercially available standard hopcalite and high Cu hopcalite catalyst materials used in Example 1 were tested in Example 2. Typical material properties are shown in Table 1.

Before a feed step, the catalyst was regenerated by heating to 200° C. (standard hopcalite catalyst) or 70° C. (high Cu hopcalite catalyst) under a flow of air for at least 4 h, then allowed to cool to room temperature.

Dry air was pre-treated (to remove carbon dioxide and trace levels of hydrogen and carbon monoxide) and used as feed gas, and dilute mixtures in nitrogen (spike gases) of carbon monoxide, hydrogen and/or carbon dioxide were blended with the feed air to achieve the desired feed gas compositions. Varying hydrogen, carbon monoxide, and carbon dioxide concentrations in air are described below in Examples 2A through 2F. Column pressure was maintained at 130 psig (0.9 MPa), and the reactor temperature was controlled with external coils circulating chilled or heated water to a temperature from 14° C., 25° C. or 40° C. The feed gas flow rate was 3.5 scfm ($1.7 \times 10^{-3}$ $m^3/s$).

A feed step was initiated by starting the desired air and spike gas flows to the column and sampling the gas at the various sample ports with a residual gas analyzer (Peak Performer 1, Peak Laboratories) to detect hydrogen and carbon monoxide. Analyzers were also available for measuring the effluent gas carbon dioxide content (Teledyne GFC7000TU) and dew point (Meeco Aquamatic+). Carbon dioxide could be seen to breakthrough prior to hydrogen on the high Cu hopcalite under some conditions, but water was never observed in the effluent.

Sampling at the multiple sample ports during a run allowed evaluation of the breakthrough performance for various gas residence times, where the residence time is defined as the volume of the catalyst layer from the feed end to the chosen sample port divided by the volumetric feed gas flow rate evaluated at the reactor temperature and pressure.

Figure 7:
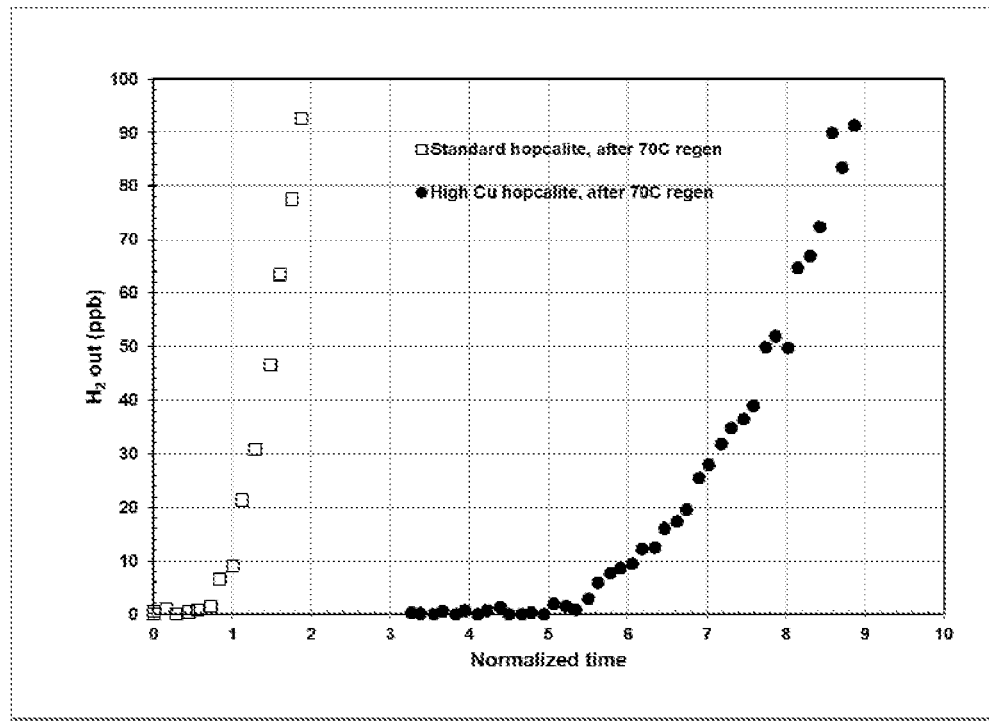
FIG. 7 is a graph depicting hydrogen breakthrough concentration vs time for hopcalite having a Cu/Mn molar ratio of 0.5 compared to hopcalite having a molar ratio of 1.0 at 5 ppmv hydrogen, 10 ppmv carbon monoxide in air at 25° C. and at 130 psig (0.9 MPa) after 70° C. regeneration temperature (see Example 2).
Figure 10:
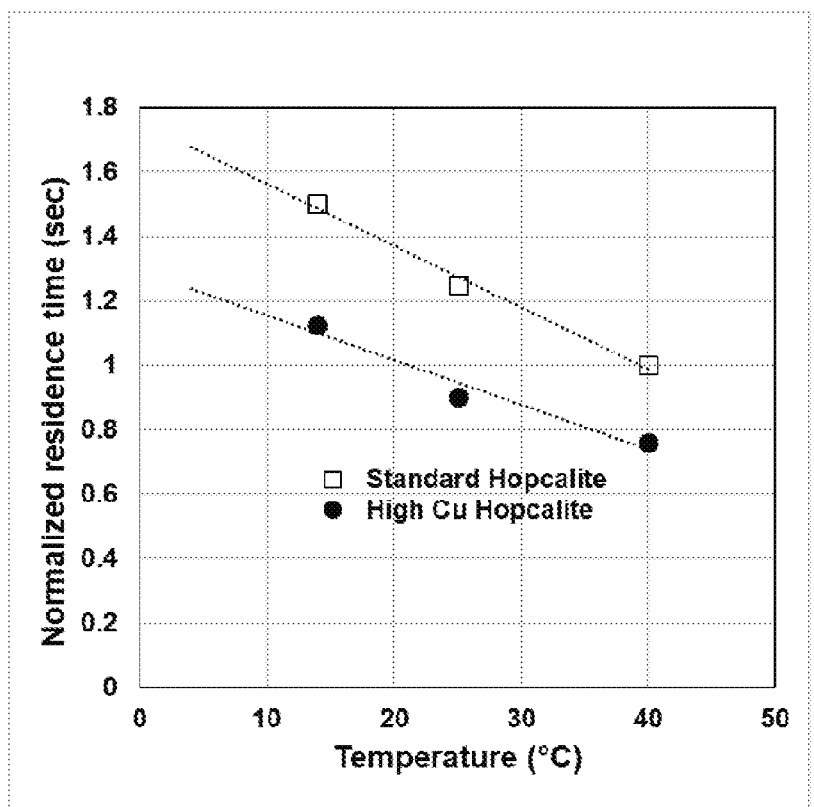
FIG. 10 is a graph depicting normalised residence times required for 10 ppb hydrogen in the product case under feed conditions of Example 2C at various feed temperatures for a standard hopcalite catalyst and a high Cu hopcalite catalyst.

Breakthrough curves were used to calculate relative residence time requirements shown in Table 1 for varying feed conditions in Examples 2A through 2E. Results of Example 2F are shown in FIG. 7. Results of Example 2C at varying feed gas temperatures, and extrapolated to lower temperatures, are shown in FIG. 10.

Example 2A 2 Ppmv Hydrogen

Example 2B 10 Ppmv Carbon Monoxide

Example 2C 2 Ppmv Hydrogen & 10 Ppmv Carbon Monoxide

Figure 5:
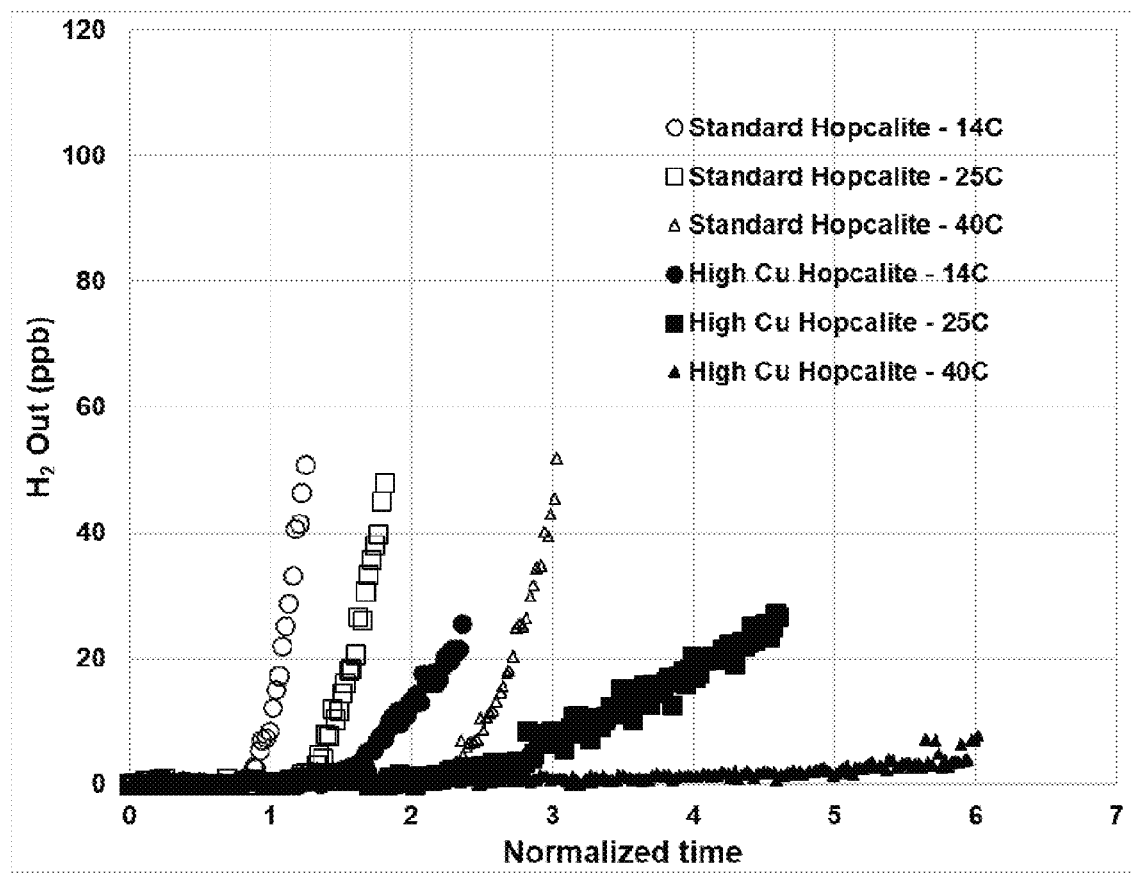
FIG. 5 is a graph depicting hydrogen breakthrough vs normalised time for hopcalite having a Cu/Mn molar ratio of 0.5 compared to hopcalite having a molar ratio of 1.0 at 2 ppmv hydrogen, 10 ppmv carbon monoxide in air at 14° C., 25° C. and 40° C. and at 130 psig (0.9 MPa) (see Example 2).

Hydrogen breakthrough results with this feed gas composition and a residence time in the catalyst layer of 2.4 s are plotted in FIG. 5.

Hydrogen breakthrough times for the high Cu hopcalite catalyst were significantly longer at all temperatures tested compared to the standard hopcalite catalyst.

Carbon monoxide and water were undetected throughout the experiment. Carbon dioxide (formed from oxidation of carbon monoxide) was detected from the high Cu hopcalite catalyst, but not the standard hopcalite catalyst.

Optimal ranges of varying properties of the hopcalite material for hydrogen capacity have been determined with breakthrough tests, as described in Example 2C, and as shown in FIG. 3A (Cu/Mn molar ratio), FIG. 3B (surface area) and FIG. 3C (pore volume) on varying commercially supplied hopcalite materials. The surface areas and pore volumes were determined by $N_2$ isotherms at 77K (Micrometrics 3Flex), and Cu/Mn ratios determined by X-ray fluorescence spectroscopy (Axios WDXRF Spectrometer).

Example 2D 2 Ppmv Hydrogen & 400 Ppmv Carbon Dioxide

Example 2E 2 Ppmv Hydrogen, 10 Ppmv Carbon Monoxide & 10 Ppmv Hydrogen Spike for 30 Minutes In this set of experiments, the hydrogen concentration was increased from 2 to 10 ppmv about 210 minutes after the start of a feed step. The spike was continued for 30 minutes before returning the hydrogen concentration to 2 ppmv.

Example 2F 2 Ppmv Hydrogen & 10 Ppmv Carbon Monoxide with 70° C. Regeneration Temperature After a feed step from the tests described in Example 2C, a further experiment was conducted on both standard hopcalite and high Cu hopcalite catalysts.

The regeneration step, prior to the feed step, was conducted at only 70° C. instead of 200° C. A feed step was then run at same conditions as described in Example 2C, while measuring hydrogen concentration exiting the gas layer at 3.5 sec residence time.

Carbon monoxide was not detected in the product gas during the experiment.

FIGS. 4 & 5 show that the high Cu hopcalite catalyst has significantly higher hydrogen capacity than the standard hopcalite catalyst, enabling the use of high Cu hopcalite for hydrogen and carbon monoxide removal in gas purification cycles utilizing low temperature regeneration (as described in, but not limited to, U.S. Pat. No. 5,614,000 which discloses TEPSA purification prior to cryogenic distillation).

Example 3—Residual Water Loading of Standard Hopcalite Vs. High Cu Hopcalite at Different Regeneration Temperatures Commercially available standard hopcalite, and high Cu hopcalite, as described above in Example 1, were saturated with adsorbed water by sealing in a 100% RH humidified chamber overnight. Each were then sampled, in 50 mg aliquots, to measure residual water loading in a thermogravimetric analyzer, or TGA (Q50001R, TA Instruments). The TGA sample cell was purged with nitrogen, and the following heating method was used:

(i) ramp 10° C./min to regeneration temperature;
(ii) dwell at regeneration temperature for 12 hours;
(iii) ramp 10° C./min to 400° C.; and
(iv) dwell at 400° C. for 30 min.

Regeneration temperatures included 60° C., 100° C., 150° C., 180° C., 200° C., 220° C. and 250° C.

The residual water (wt %) was calculated using the following formula:

$$100 \times \frac{\text{(weight loss between regeneration temperature and 400° C.)}}{\text{(sample weight after 400° C. dwell)}}$$

Figure 8:
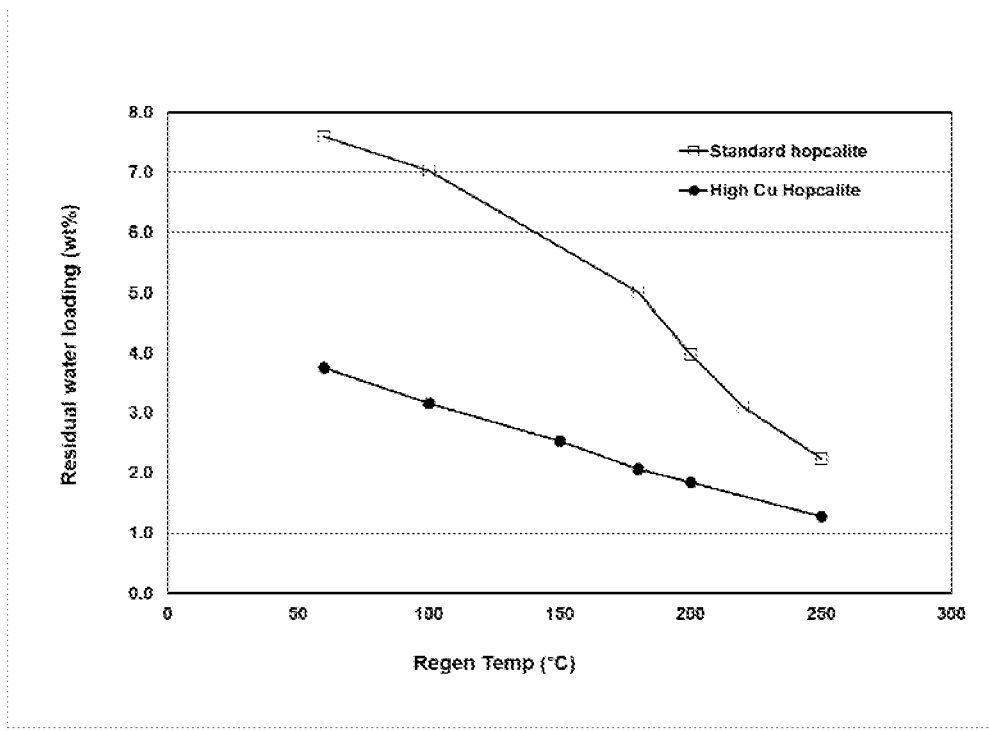
FIG. 8 is a graph depicted water loading vs regeneration temperature for a standard hopcalite catalyst and a high Cu hopcalite catalyst.

As shown in FIG. 8, the high Cu hopcalite catalyst had less residual water than the standard hopcalite catalyst at any given regeneration temperature. It is known in the art that adsorbed water deactivates the catalyst. Therefore, these results suggest that the high Cu hopcalite catalyst can be regenerated at lower temperatures than the standard hopcalite catalyst Example 4—Different Layering Arrangements for an Air Pre-Purification Unit An air pre-purification adsorption unit can be designed using different adsorbents to remove water, carbon dioxide, hydrogen, and carbon monoxide.

Figure 9:
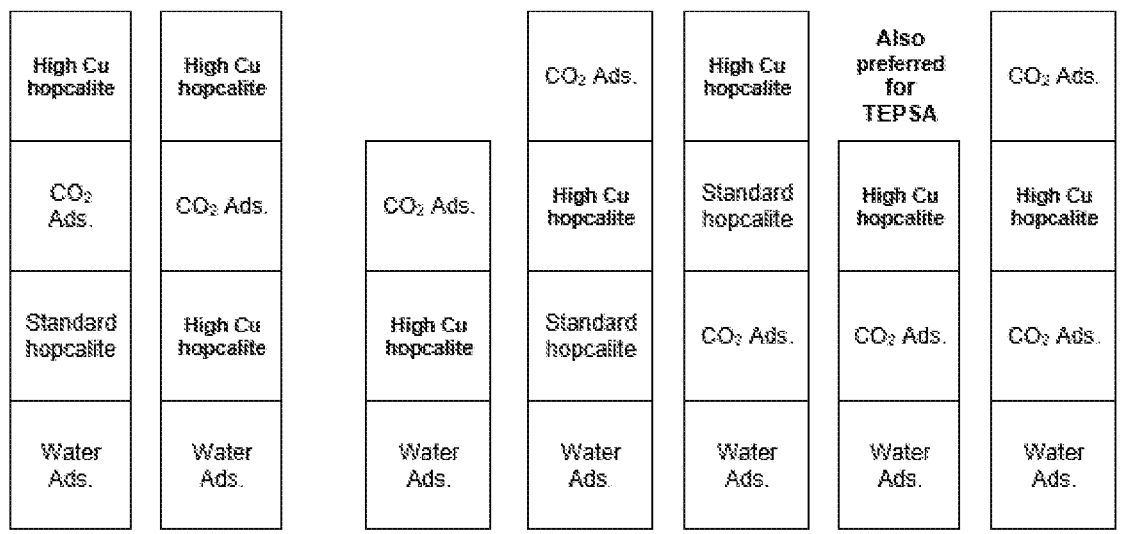
FIG. 9 depicts different layering options in adsorbent beds of adsorption units according to the second aspect of the present invention.

An air feed at a pressure of 130 psig and a temperature of 25° C. can contain 1900 ppmv water, 400 ppmv carbon dioxide, 2 ppmv hydrogen and 10 ppmv carbon monoxide. As shown in FIG. 9, many possible layering configurations can accomplish the removal of these impurities.

Figure 11:
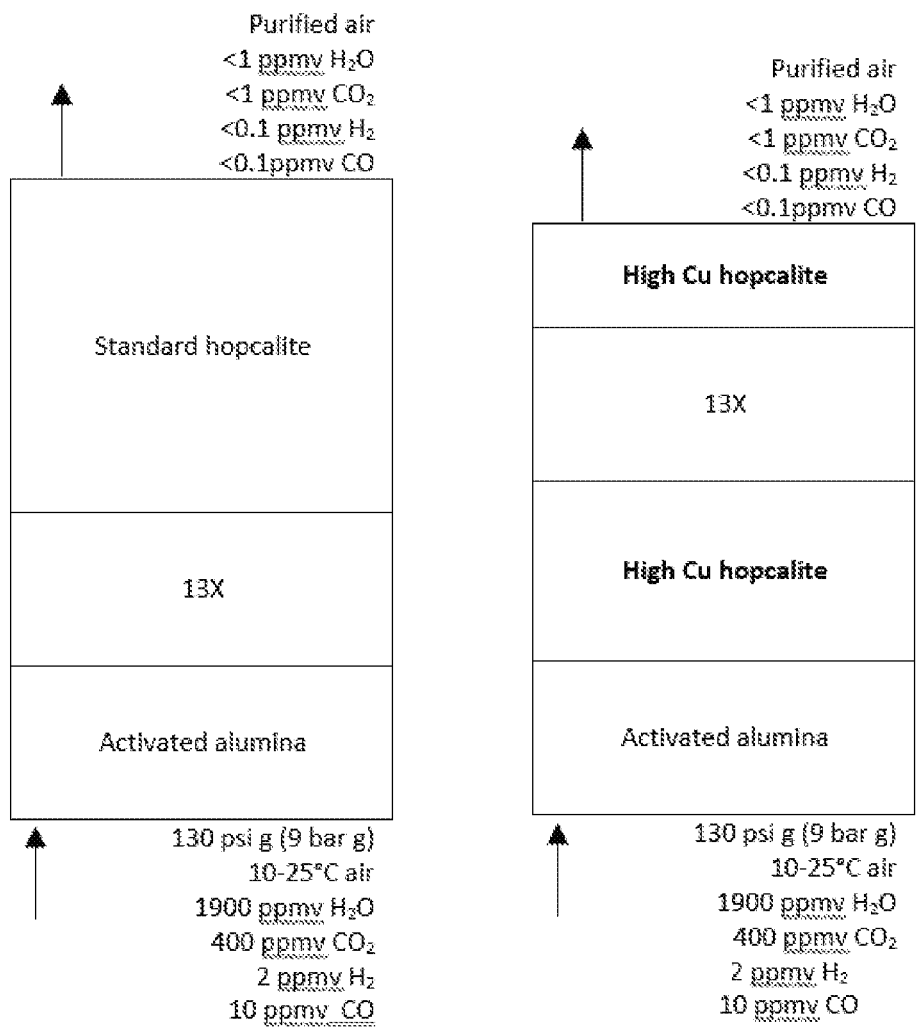
FIG. 11 is a schematic representation of a layered adsorption bed involving a standard hopcalite catalyst compared to a layered adsorption bed involving a high Cu hopcalite catalyst for achieving the equivalent end purity of air.

The arrangement exemplified in FIG. 1 of EP2789376A (where standard hopcalite catalyst (Carulite 300) was used as a single layer at the product end of the bed for removal of hydrogen and carbon monoxide removal) is illustrated in FIG. 11 in comparison with a corresponding arrangement according to the present invention. In this regard, by using high Cu hopcalite catalyst, split into two layers, less catalyst is required to reduce hydrogen and carbon monoxide impurities each below 0.1 ppmv. Alumina and 13× can be used in either configuration to reduce water and carbon dioxide respectively, below 1 ppmv in the product gas, i.e. purified air.

Such an adsorption unit could be run in a cyclic fashion, where purge gas, taken from the downstream cryogenic distillation process, can be used to regenerate the materials in the adsorption unit at ambient pressure and a temperature of 200° C., before cooling the adsorption bed and re-pressurizing the unit back to feed conditions to begin another on-stream cycle.

The feed air can also be chilled by a device to a temperature in the range from 10° C. to 15° C. to enable further advantages arising from the use of high Cu hopcalite catalyst. At lower feed temperatures, the overall size of the adsorption unit can be reduced as the colder air will contain less water vapor, and accordingly less alumina will be required. Further, alumina and 13× will have increased adsorption capacity for water and carbon dioxide at lower temperature. However, while the hopcalite catalyst requirement will increase at colder temperatures, the increase in requirement regarding the high Cu hopcalite catalyst will be less than that for the standard hopcalite catalyst, as illustrated in FIG. 11.

Regarding embodiments of the present invention according to FIG. 11, a layer of water adsorption material (e.g. alumina) at the front end of the bed is typically the most practical arrangement.

A first layer of hopcalite catalyst can be used next for removal of trace carbon monoxide. This layer can be standard hopcalite catalyst or high Cu hopcalite catalyst. If high Cu hopcalite catalyst is used, a reasonable amount of residence time can be used to remove at least substantially all trace hydrogen as well (see Table 1). An advantage of high Cu hopcalite catalyst in this location (immediately after the alumina layer) is being closer to the temperature rise from water adsorption on alumina, where higher temperature improves capacity in the catalyst layer (FIG. 5). Standard hopcalite cannot be placed immediately after the alumina layer due to the sensitivity of the hopcalite to carbon dioxide (see EP2789376A).

Hopcalite catalysts with lower surface areas will have lower carbon dioxide capacity. The lower surface area of high Cu hopcalite catalyst necessitates the presence of a carbon monoxide oxidation layer upstream of a carbon dioxide removal layer. Low surface area hopcalite cannot be the final layer if carbon monoxide is still present in the feed gas, otherwise carbon dioxide made from carbon monoxide oxidation will end up in the product stream. Therefore, a layer of carbon dioxide adsorbent material (e.g. 13X) is typically next.

In embodiments in which there is a relatively large amount of hydrogen, carbon monoxide and/or carbon dioxide in the feed gas, a second layer of high Cu hopcalite catalyst may be used as a final purification layer.

As taught in EP2789376A, a standard hopcalite catalyst must be placed after a layer to remove water and a layer to remove carbon dioxide as these impurities poison the hopcalite catalyst and dramatically reduce its effectiveness towards hydrogen and carbon dioxide oxidation.

In contrast, high Cu hopcalite catalyst is less sensitive to carbon dioxide. Without wishing to be bound by any particular theory, the Inventors attribute this insensitivity to (a) higher Cu/Mn ratio giving higher hydrogen activity, and (b) the relative lower surface area and higher CuO content decreasing affinity of the material for water, which would normally poison hopcalite activity. While the carbon monoxide removal effectiveness is lower than standard hopcalite, one skilled in the art can design a front-end adsorption unit using less overall catalyst compared to simply using standard hopcalite (see Table 1).

Table 1 provides details of relative required contact times, showing how high Cu hopcalite catalyst reduces the amount of residence time needed compared with standard hopcalite for varying impurities in the feed gas.

The use of "high copper" or "high Cu" hopcalite catalysts to remove hydrogen impurity enables shorter catalyst bed lengths, lower capital expense (less vessel steel) and lower operational costs (lower pressure drop/power and lower energy for regeneration).

Figure 6A:
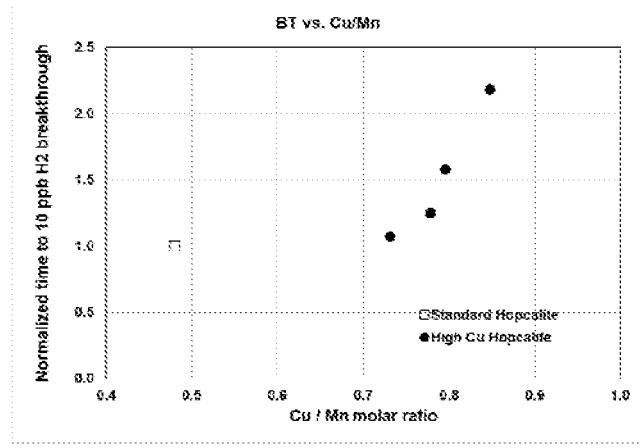
FIG. 6A is a graph depicting normalised breakthrough time to 10 ppb hydrogen vs Cu/Mn molar ratio of hopcalite (see Example 2).
Figure 6B:
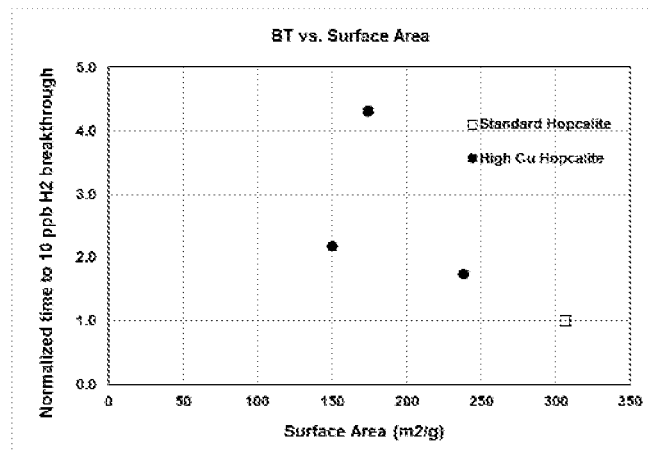
FIG. 6B is a graph depicting normalised breakthrough time to 10 ppb hydrogen vs surface area of hopcalite (see Example 2).
Figure 6C:
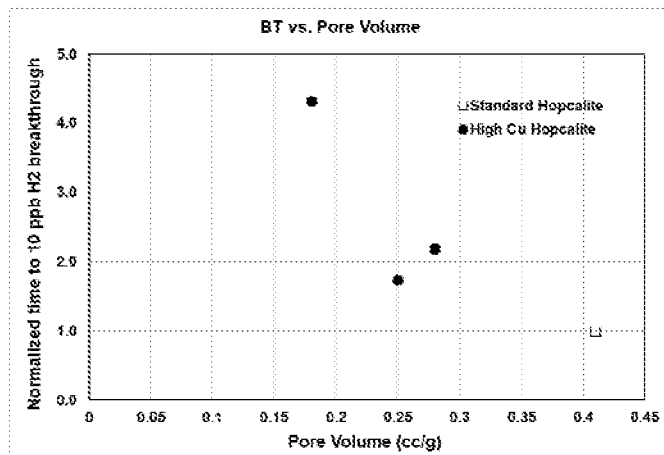
FIG. 6C is a graph depicting normalised breakthrough time to 10 ppb hydrogen vs pore volume of hopcalite (see Example 2).

Additional advantages resulting from the use a high Cu hopcalite catalyst over a standard hopcalite catalyst to remove trace hydrogen from a dry gas such as dry air include:

- increased hydrogen capacity (and hence on-stream time) at both ambient temperature (see FIGS. 4 & 5) and below, e.g. at 14° C. (see FIG. 5)
- reduced sensitivity to the presence of carbon dioxide (see Example 2D, Table 1) and to spikes in hydrogen feed concentration (see Example 2E)
- increased ease of regeneration (FIGS. 6 & 7) resulting in less energy being required in a TSA system—versions of TSA which utilize less regeneration heat, such as thermal pressure swing adsorption (TPSA) cycles (see, for example, U.S. Pat. No. 5,855,650) can be more easily implemented
- use of hopcalite to remove trace hydrogen in a broader range of air pre-purification cycles as a result of lowered required regeneration temperature—range extended to include thermally enhanced pressure swing adsorption (TEPSA) cycles (see, for example, U.S. Pat. No. 5,614,000) or pressure swing adsorption (PSA) cycles, where the prior art uses noble metal catalyst for trace hydrogen removal (see, for example, U.S. Pat. Nos. 5,202,096 or 5,906,675)—high Cu hopcalite catalyst would be less expensive than noble metal catalyst in either TEPSA or PSA These advantages enable more flexibility in the configuration of an air pre-purification system for high purity nitrogen (FIG. 9). Purifiers using high copper hopcalite catalysts require less catalyst, particularly in cases with greater amounts of hydrogen impurity in the feed gas. This is useful, for example, in retrofitting existing plants that unexpectedly develop higher amounts of hydrogen impurity in the feeds from new industrial installations in nearby operations.

While the invention has been described with reference to the preferred embodiments depicted in the figures, it will be appreciated that the invention is not restricted to the details described above with reference to the preferred embodiments but that numerous modifications and variations can be made without departing from the spirit and scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

We claim:

1. A process for removing hydrogen from a dry gas comprising hydrogen as an impurity, said process comprising passing said dry gas at a temperature from about 0° C. to about 60° C. through at least one layer of a first hopcalite catalyst to produce product gas that is at least substantially free of hydrogen, wherein said first hopcalite catalyst has a molar ratio of copper to manganese of more than 0.55.

2. The process according to claim 1, wherein said molar ratio of copper to manganese in said first hopcalite catalyst is less than 7.

3. The process according to claim 1, wherein said molar ratio of copper to manganese in said first hopcalite catalyst is in a range from about 0.6 to 4.

4. The process according to claim 1, wherein said molar ratio of copper to manganese in said first hopcalite catalyst is in a range from about 2 to about 4.

5. The process according to claim 1, wherein said molar ratio of copper to manganese in said first hopcalite catalyst is in a range from about 0.6 to about 1.2.

6. The process according to claim 1, wherein said first hopcalite catalyst has a surface area of less than 280 $m^2/g$.

7. The process according to claim 1, wherein said first hopcalite catalyst has a surface area in a range from about 100 $m^2/g$ to about 200 $m^2/g$.

8. The process according to claim 1, wherein said first hopcalite catalyst has a total pore volume of less than 0.4 $cm^3/g$.

9. The process according to claim 1, wherein said first hopcalite catalyst has a total pore volume in a range from about 0.1 $cm^3/g$ to about 0.3 $cm^3/g$.

10. The process according to claim 1, wherein said hydrogen impurity is present in said dry gas in an amount of up to 40 ppmv.

11. The process according to claim 1, wherein said hydrogen impurity present in said dry gas in an amount of more than 20 ppmv.

12. The process according to claim 1, wherein said dry gas comprises carbon dioxide in an amount up to 900 ppmv.

13. The process according to claim 1, wherein said layer(s) of said first hopcalite catalyst is/are regenerated at a temperature below 200° C.

14. The process according to claim 1, wherein said layer(s) of said first hopcalite catalyst is/are regenerated at a temperature no more than 150° C.

15. The process according to claim 1, wherein said layer(s) of said first hopcalite catalyst is/are regenerated at a temperature no more than 80° C.

16. The process according to claim 1, wherein the temperature of said dry gas is in a range from about 10° C. to about 15° C.

17. The process according to claim 1, wherein said dry gas is passed through said layer(s) of said first hopcalite catalyst at a pressure in a range from about 3 bar to about 45 bar (0.3 MPa to 4.5 MPa).

18. The process according to claim 1, said process comprising passing the dry gas through at least one layer of a second hopcalite catalyst upstream of said layer(s) of said first hopcalite catalyst, wherein said second hopcalite catalyst has a molar ratio of copper to manganese of no more than 0.55.

19. A process for removing hydrogen from dry air comprising said hydrogen as an impurity, said process comprising passing said dry air at a pressure from about 3 bar to about 45 bar (0.3 MPa to 4.5 MPa) and at a temperature from about 0° C. to about 60° C. through at least one layer of a first hopcalite catalyst to produce dry air that is at least substantially free of hydrogen, wherein said first hopcalite catalyst has a molar ratio of copper to manganese in a range from about 2 to about 4.

20. A process for removing hydrogen and carbon monoxide from dry air comprising said hydrogen and said carbon monoxide as impurities, said process comprising passing said dry air at a pressure from about 3 bar to about 45 bar (0.3 MPa to 4.5 MPa) and at a temperature from about 0° C. to about 60° C. through at least one layer of a first hopcalite catalyst to produce dry air that is at least substantially free of hydrogen and carbon monoxide, wherein said first hopcalite catalyst has a molar ratio of copper to manganese in a range from about 0.6 to about 1.2.

\* \* \* \* \*

UNITED STATES PATENT AND TRADEMARK OFFICE
CERTIFICATE OF CORRECTION

Page 1 of 1

PATENT NO. : 11,173,451 B1
APPLICATION NO. : 17/083435
DATED : November 16, 2021
INVENTOR(S) : Garret Chi-Ho Lau et al.

It is certified that error appears in the above-identified patent and that said Letters Patent is hereby corrected as shown below:

On the Title Page

Item (72), delete "Guarav Kumar" and replace with:
"Gaurav Kumar"

Signed and Sealed this
Twelfth Day of April, 2022

Drew Hirshfeld
*Performing the Functions and Duties of the
Under Secretary of Commerce for Intellectual Property and
Director of the United States Patent and Trademark Office*